US005553298A

United States Patent [19]
Merryman et al.

[11] Patent Number: 5,553,298
[45] Date of Patent: Sep. 3, 1996

[54] METHOD AND APPARATUS FOR MUTUAL EXCLUSION IN SELF-DIRECTED DISTRIBUTED SYSTEMS

[76] Inventors: Philip I. Merryman, deceased, late of Santa Ana, Calif.; Diana G. Merryman, administrator, 2203B E. Santa Clara Ave., Santa Ana, Calif. 92705

[21] Appl. No.: 227,668

[22] Filed: Apr. 14, 1994

[51] Int. Cl.$^6$ .................................................. G06F 15/00
[52] U.S. Cl. ................. 395/800; 395/200.19; 395/182.1; 395/726; 395/730
[58] Field of Search ...................................... 395/800, 200, 395/425, 325, 820, 200.01, 299, 726, 730, 200.19, 182.1, 726

[56] References Cited

U.S. PATENT DOCUMENTS

| | | | |
|---|---|---|---|
| 5,197,130 | 3/1993 | Chen et al. | 395/800 |
| 5,265,235 | 11/1993 | Sindhu et al. | 395/447 |
| 5,283,870 | 2/1994 | Joyce et al. | 395/479 |

OTHER PUBLICATIONS

John P. Hayes, *Computer Architecture and Organization*, 1988, pp. 468–557.
V. Carl Hamacher et al., *Computer Organization*, 1990, pp. 461–483.
"A New Solution of Dijkstra's Concurrent Programming Problem" by Leslie Lamport, Massachusetts Computer Associates, Inc. Association for Computing Machinery, Inc. August 1974, vol. 17, No. 8.
"The Mutual Exclusion Problem: Part II—Statement and Solutions" by Leslie Lamport, Journal of the Association for Computing Machinery, vol. 33, No. 2, Apr. 1986, 327–348.
"Proving Total Correctness of Parallel Programs" by Alan F. Babich, IEEE Transactions on Software Engineering, vol. SE–5, No. 6, Nov. 1979.
"A Proof Method for Cyclic Programs" by Missim Francez and Amir Pnueli, Informatica, Springer–Verlag 1978.
"Proving Liveness Properties of Concurrent Programs" by Susan Owicki and Leslie Lamport, ACM Transactions on Programming Languages and Systems, vol. 4, No. 3 Jul. 1982.
"An Optimal Algorithm for Mutual Exclusion in Computer Networks" by Glenn Ricart and Ashok K. Agrawala, Association for Computing Machinery, Jan. 1981, vol. 24, No. 1.

*Primary Examiner*—Alyssa H. Bowler
*Assistant Examiner*—John Follansbee
*Attorney, Agent, or Firm*—Michael Zarrabian; Sheldon & Mak, Inc.

[57] ABSTRACT

A self-directed distributed system provides a method for mutual exclusion of asynchronously interacting processors. The system comprises a system for control of access to a shared resource in a multi-processing computing environment, comprising at least two processors; an interconnection system interconnecting the processors, whereby each processor can communicate with all other processors; a resource for shared access by the processors; communication means within each processor for sending an interest signal to all other processors for signalling the interest of the processor in acquiring the resource; receiving means within each processor for receiving the interest signal of every other processor; interest vector means within each processor for storing the received interest signal of every other processor; and means within each processor for interrogating the interest vector means in the processor to determine the availability of the resource. Each processor can acquire the resource only if (1) the processor's interrogation of its interest vector means indicates no interest in acquiring the resource by any other processor; For every pair of processors, P1 and P2, the processor P1 delays interrogation of its interest vector means a sufficient time after the processor P1's interest signal is sent, that the time gap between the processor P1's interrogation of its interest vector means and the arrival of the processor P1's interest signal at the processor P2 (T1) is not less than time between the processor P2's interrogation of its interest vector means and the time the processor P2's interest signal arrives at the processor P1 (T2).

18 Claims, 11 Drawing Sheets

FIG. 4

PSEUDO CODE FOR PROCESSOR $P_i$ (1) SEND INTEREST SIGNAL FOR $P_i$ TO ALL PROCESSORS $P_j$, WHERE $j \neq i$;

(2) DELAY INTERROGATION OF $P_i$'S INTEREST VECTOR MEANS IN STEP 3 A SUFFICIENT TIME SUCH THAT THE TIME GAP $T_i$ BETWEEN $P_i$'S INTERROGATION OF ITS INTEREST VECTOR MEANS AN ARRIVAL OF $P_i$'S INTEREST SIGNAL AT $P_j$ IS AT LEAST EQUAL TO THE TIME GAP $T_j$ BETWEEN $P_j$'S INTERROGATION OF $P_j$'S INTEREST VECTOR MEANS AND THE TIME $P_j$'S INTEREST SIGNAL ARRIVES AT $P_i$, SO THAT IS $T_i + T_j \geq 0$;

(3) INTERROGATE $P_i$'S INTEREST VECTOR MEANS AND ACQUIRE THE RESOURCE IF THE INTERROGATION INDICATES NO INTEREST IN ACQUIRING THE RESOURCE BY ANY OTHER PROCESSOR $P_j$.

COMPUTER STEPS FOR PROCESSOR $i, i \neq j$

LINE 1: SHARED BOOLEAN ALL $a_i$;

LINE 2: REPEAT

LINE 3:    $a_i := $ TRUE;

LINE 4:    (IRRELEVANT ACTIVITY)

LINE 5:    [STEP 1] $a_i := $ FALSE

LINE 6:    [STEP 2] DELAY ($a_j := $ FALSE; WHILE ($j \neq k \wedge a_k = $ FALSE))

LINE 7:    [STEP 3] WHILE ($j \neq i \wedge a_j = $ FALSE);

LINE 8:    (CRITICAL SECTION)

LINE 9: UNTIL (FALSE);

Fig. 5

① $P_i$ SENDS SIGNAL TO ACQUIRE A RESOURCE.

② $P_j$ SENDS SIGNAL TO ACQUIRE THE SAME RESOURCE

③ $P_i$'S INTEREST SIGNAL ARRIVES AT $P_j$.

④ $P_j$'S INTEREST SIGNAL ARRIVES AT $P_i$.

⑤ $P_i$ INTERROGATES ITS INTEREST VECTOR MEANS AND ACQUIRES THE RESOURCE IF NO INTEREST SIGNAL FROM OTHER PROCESSORS HAS ARRIVED.

⑥ $P_j$ INTERROGATES ITS INTEREST VECTOR MEANS AND ACQUIRES THE RESOURCE IF NO INTEREST SIGNAL FROM OTHER PROCESSORS HAS ARRIVED.

↑ TIME

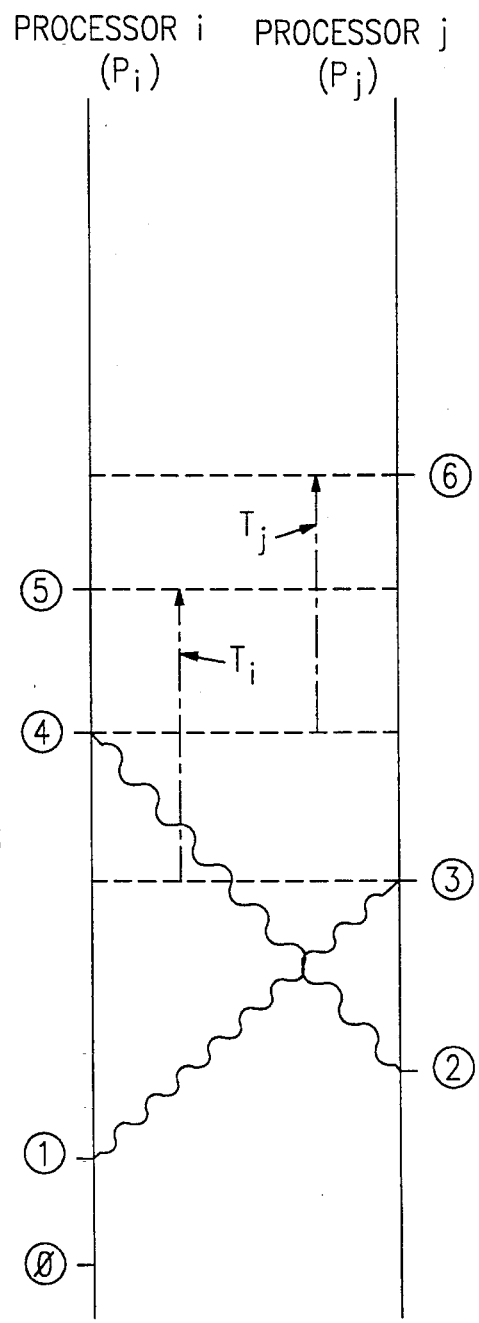

FIG. 6

PSEUDO CODE FOR THE PRIMARY PROCESSOR $P_o$ (1) (A) INTERROGATE THE PRIMARY PROCESSOR $P_o$'S INTEREST VECTOR MEANS TO DETERMINE IF AN INTEREST SIGNAL HAS ARRIVED FROM ANY OTHER PROCESSOR;

(B) ACQUIRE THE RESOURCE IF THE INTERROGATION INDICATES NO INTEREST SIGNAL FROM ANY OTHER PROCESSOR;

(2) SEND AN ACQUISITION SIGNAL TO OTHER PROCESSORS TO INFORM THEM OF ACQUISITION OF THE RESOURCE BY THE PRIMARY PROCESSOR $P_o$.

PSEUDO CODE FOR A SECONDARY PROCESSOR $P_i$ (1) SEND AN INTEREST SIGNAL FOR $P_i$ TO ALL PROCESSORS $P_j$, WHERE $i \neq j$;

(2) DELAY INTERROGATION AT $P_i$'S INTEREST VECTOR MEANS A SUFFICIENT TIME SUCH THAT THE TIME GAT $T_i$ BETWEEN $P_i$'S INTERROGATION OF ITS INTEREST VECTOR MEANS AND ARRIVAL OF $P_i$'S INTEREST SIGNAL AT $P_j$, IS AT LEAST EQUAL TO THE TIME GAP $T_j$ BETWEEN $P_j$'S INTERROGATION OF $P_j$'S INTEREST VECTOR MEANS AND THE TIME $P_j$'S INTEREST SIGNAL, IF $P_j$ IS A SECONDARY PROCESSOR OR ACQUISITION SIGNAL IF $P_j$ IS THE PRIMARY PROCESSOR, ARRIVES AT $P_i$, SO THAT IS $T_i + T_j \geq 0$;

(3) INTERROGATE $P_i$'S INTEREST VECTOR MEANS AND ACQUIRE THE RESOURCE IF THE INTERROGATION INDICATES NO INTEREST IN ACQUIRING THE RESOURCE BY ANY OTHER PROCESSOR $P_j$.

COMPUTER STEPS FOR PROCESSOR $P_0$:

LINE 1: SHARED BOOLEAN ALL $a_i$;

LINE 2: REPEAT

LINE 3:    $a_0 := $ TRUE;

LINE 4:    (IRRELEVANT ACTIVITY)

LINE 5:    [STEP 1] WHILE ($i \neq o \wedge a_i = $ FALSE);

LINE 6:    [STEP 2] $a_0 := $ FALSE;

LINE 7:    (CRITICAL SECTION)

LINE 8: UNTIL (FALSE)

FIG. 9A

COMPUTER STEPS FOR PROCESSOR $i \neq o$

LINE 1: SHARED BOOLEAN ALL $a_i$;

LINE 2: REPEAT

LINE 3:    $a_i = $ TRUE;

LINE 4:    (IRRELEVANT ACTIVITY)

LINE 5:    [STEP 1] $a_i := $ FALSE;

LINE 6:    [STEP 2] DELAY (WHILE ($i \neq o \wedge a_i = $ FALSE); $a_0 = $ FALSE)

LINE 7:    [STEP 3] WHILE ($j \neq i \wedge a_j = $ FALSE);

LINE 8:    (CRITICAL SECTION)

LINE 9: UNTIL.

FIG. 9B

METHOD AND APPARATUS FOR MUTUAL EXCLUSION IN SELF-DIRECTED DISTRIBUTED SYSTEMS

BACKGROUND

The present invention relates generally to distributed systems, and in particular to self-directed distributed system.

Computers initially consisted of a single machine built from processors, memories, and Input/Output devices. Now, many computers are interconnected to form networks and distributed systems. A distributed system is a collection of computers that acts like a single machine to its users. In other words, the users are not aware of the existence of multiple independent computers.

Many goals motivate connecting widely separated computers together in a distributed system. A distributed system allows its users to conveniently share load, data, documents, and ideas. Distributed systems also allow users to take advantage of unique resources such as unusual computers, Input/Output devices, and large databases located at remote sites. If the workload at one computer becomes more than that computer can handle, some of it can be transferred to another computer with a lighter workload. Furthermore, the reliability of a distributed system can be much higher than the reliability of any of its components.

The processors in a distributed system can be used in several ways. For example, they can be used as dedicated processors, where each processor performs a specific function, or as pool processors. Pool processing can be more efficient than dedicated processing because pool processors do not have specifically assigned tasks. Instead, when a user needs to run a program for which no server processor exists, one or more processors from the pool are temporarily assigned. When the job is finished, the processors are returned to the pool to wait for reassignment.

In this configuration, it is advantageous to design programs as a collection of cooperating processes, to allow each process to run on a separate processor, and thus be faster than having them all share a single processor.

However, there is additional complexity when multiple processors work simultaneously and support multiple asynchronous tasks which execute concurrently. Each process executes with unpredictable speed and generates actions or events which must be recognized by other cooperating processes. Therefore, cooperating processes in a multi-processor environment must often communicate and synchronize with each other. Execution of one process can influence the other via communication. Often the processes that communicate do so via a synchronization mechanism. The synchronization mechanism is used to delay execution of a process in order to satisfy ordering of actions among cooperating processes.

For example, when several cooperating processes compete for a certain type of resource, such as a printer or a data base, the resource must be controlled so that it is never in use by more than one process at a time (mutual exclusion). For proper operation of processes, it is necessary that the resource be granted to at most one process at a time since processes modify the state of the resource.

When resource usage is under the centralized control of an operating system, mutually exclusive use of resources is implemented via conventions used by processes for signalling the operating system that specific resources are requested or released. However, when resource usage is not under centralized control of an operating system, control is based on system status variables residing in each processor (self-directed). The processes themselves must bear the responsibility for controlling their progress to implement mutual exclusion.

A desirable method for mutual exclusion in a self-directed system must account for the varying speeds of processes executing on different processors, and for possible "race" conditions: For example, two processes on different processors can start acquiring a desired resource before either has had sufficient opportunity to prevent the other from acquiring the resource (race condition). Moreover, no process requesting the use of the resource can be waiting indefinitely for other processes requesting or using the resource. Preferably, under no circumstances should mutual exclusion be achieved by completely blocking the use of the resource from any one or more of the processes requiring it. Therefore, asynchronous processes in a multi-processor environment must communicate and synchronize to implement proper resource allocation.

Since a distributed system is a collection of interconnected processors, the performance of the distributed system is highly sensitive to communication time between the processors. Existing protocols for mutual exclusion do not account for communication delays caused by the interconnection topology in a distributed system and are therefore unsuitable for use in distributed systems. The protocols for registering and reacting to status information to determine system behavior mostly apply to multi-tasking on a single processor where interprocessor communication is not an issue.

There are protocols for mutual exclusion in multi-processor systems where several processors are interconnected. These protocols assume inter-processor communication times in the order of instruction times. However, the timing and synchronization assumptions of these protocols are inappropriate to distributed systems because signal propagation times in distributed systems exceed instruction times. Therefore, a seemingly workable and efficient protocol which assumes fast signal propagation speeds will be unworkable or inefficient for a computing environment where signal propagation times are higher than the protocol assumes because the signal propagation delay must be added to the processing time.

Other protocols require every process desiring to use a shared resource to first broadcast a signal to all other processes and then find that a signal from another process for the same resource has not arrived. A major problem with such protocols for mutual exclusion of asynchronously interacting processes in self-directed distributed systems is that they call for the broadcast of a preempt signal, and then a wait delay until propagation is completed, before testing the availability of a shared resource. The wait delay slows down the system.

A further problem is that every process has to wait for the longest propagation time. This results in further degradation of system response time. Often, distributed systems are utilized in interactive or real time applications where response time is critical. Example of such applications include operations, security, defense, air traffic control, etc. For example, in an air traffic control room, as result of delays in gaining access to a shared resource, the system response times might be dangerously slow and two controllers might get delays or locked out, resulting in minutes of blacked out screens. Where processors are more distant, problems of this nature become more serious.

Even in those applications where response time is not critical, expensive processing time is wasted by idling processors while broadcast signals make their way throughout a distributed system to sort out who gets what resource.

Advances in semiconductor technology and circuit design have enabled modern processors to operate at increasingly higher speeds. Every new generation of processors is designed to surpass the previous ones in terms of speed. As the gap between processor and communication speeds widens, existing protocols for mutual exclusion in distributed systems become even more inefficient, if not impractical. That is because the processors idle while waiting for signal propagation. Furthermore, any upgrade of the processors in such distributed system for speed is stifled because the slow communication speeds limit the performance of the entire distributed system.

Thus, there is a need for a method for mutual exclusion of asynchronously interacting processors in self-directed distributed systems wherein the processors can operate with close to minimum delay. There is also a need for such a protocol whereby the system can be reliably utilized in time critical applications. There is also a need for such a protocol whereby investments in processor upgrades are not stifled by slow signal propagation speeds. There is also a need for such a protocol wherein computing time is not wasted by idling processors.

SUMMARY

The invention provides an apparatus and a method for mutual exclusion of asynchronously interacting processors in self-directed distributed systems that satisfies these needs. The apparatus comprises a system for control of access to a shared resource in a multi-processing computing environment. The invention is based on the principle that a primary processor in the system automatically has priority to one or more resources, and all other processors, referred to as "secondary processors", cannot have access to the resource until it is determined that the primary processor does not want the resource. The primary processor dispenses with first signaling the secondary processors and the associated signal propagation delay.

The system comprises: a primary processor; at least one secondary processor; an interconnection system interconnecting the processors, so that each processor can communicate with all other processors; and a resource for shared access by all processors. The system further comprises: a communicator for each secondary processor for sending an interest signal to all other processors for signalling the interest of the secondary processor in acquiring the resource; a communicator for the primary processor for sending an acquisition signal to all secondary processors for signalling the acquisition of the resource by the primary processor to all secondary processors; a receiver and an interest vector for each secondary processor for receiving and storing the interest signal of every other secondary processor and for receiving and storing the acquisition signal of the primary processor; a receiver and an interest vector for the primary processor for receiving and storing the interest signal of the secondary processors; and an interrogator for each processor for interrogating the interest vector for the respective processor to determine the availability of the resource.

The system further comprises: an acquirer for the primary processor for acquiring the resource; first controller allowing the primary processor's acquirer to acquire the resource only if the primary processor's interrogation of its interest vector indicates no interest in acquiring the resource by any secondary processor, wherein the primary processor can acquire the resource without first sending out an interest signal; an acquirer for each secondary processor for acquiring the resource after the secondary processor signals its interest in acquiring the resource; a second controller for delaying the interrogator of each processor a sufficient time after the secondary processor's interest signal is sent, that the time gap between the secondary processor's interrogation of its interest vector and the arrival of the secondary processor's interest signal at the primary processor (T1) is at least equal to the time between the primary processor's interrogation of its interest vector and the time the primary processor's acquisition signal arrives at that secondary processor (T2); and a third controller allowing each secondary processor to acquire the resource only if the secondary processor's interrogation of its interest vector indicates no interest in acquiring the resource by any other processor;

The second controller also delays the interrogator of each secondary processor such that for every pair of secondary processors, P1 and P2, the processor P1's interrogation of its interest vector is delayed a sufficient time after the processor P1's interest signal is sent, that the time gap between the processor P1's interrogation of its interest vector and the arrival of the processor P1's interest signal at the processor P2 (T1) is at least equal to the time between the processor P2's interrogation of its interest vector and the time the processor P2's interest signal arrives at the processor P1 (T2).

The primary processor can be a master processor and the secondary processors can be slave processors, wherein the slave processors run a peer to peer network amongst themselves without being monitored by the master processor.

In a preferred embodiment, the system further comprises a preventor for assuring that no circumstance totally denies access to the resource by any processor, whereby every processor desiring to acquire the resource can ultimately acquire the resource.

The system can have a single shared resource or a plurality of shared resources.

The computing environment of the invention can be a network, or a real-time system.

In another embodiment of the invention, there is no difference between the processors (i.e., there is no primary processor) wherein each processor can acquire the resource only if: (1) the processor's interrogation of its interest vector indicates no interest in acquiring the resource by any other processor, and (2) for every pair of processors, P1 and P2, the processor P1's interrogation of its interest vector is delayed a sufficient time after the processor P1's interest signal is sent, that the time gap between the processor P1's interrogation of its interest vector and the arrival of the processor P1's interest signal at the processor P2 (T1) is at least equal to the time gap between the processor P2's interrogation of its interest vector and the time the processor P2's interest signal arrives at the processor P1 (T2).

The delays T1 and T2 can be changed by moving the processor locations whereby signal propagation times are affected. Therefore, in preferred embodiments, the system can further comprise means for varying the time gaps T1 and T2 for any given pair of processors to account for changing signal propagation times. The system can also comprise means used to vary the time gaps T1 and T2 dynamically while all the processors continue operating. The system can also comprise monitoring means used to monitor the time gaps T1 and T2 to ensure that the time gap T1 is at least equal to the time gap T2 at all times.

In the embodiment with a primary processor and secondary processors, the system operates as follows:

(a) each secondary processor seeking to acquire the resource performs the steps of: (1) sending an interest signal to all other processors for signalling the interest of the processor in acquiring the resource; (2) entering a delay period such that the time gap between the next step (3) and arrival of the processor's interest signal at the primary processor (T1) is at least equal to the time gap between the primary processor's step 3 and the time the primary processor's interest signal reaches the secondary processor; and (3) determining if an interest signal from other secondary processors or an acquisition signal from the primary processor has arrived, and acquiring the resource if neither signal has arrived; and (b) the primary processor, when it is seeking to acquire the resource, performs the steps of: (1) determining if an interest signal from the other processors has arrived; (2) acquiring the resource if no interest signal from the other processors has arrived; and (3) sending an acquisition signal to the other processors to inform them of the acquisition of the resource by the primary processor.

In the embodiment where all processors are the same (i.e., there is no primary processor), the system operates as follows: (1) a processor seeking to acquire a resource sends an interest signal to all other processors for signalling the interest of the respective processor in acquiring the resource; (2) enters a delay period such that for every pair of processors, P1 and P2, the time gap between the next step (3) of the processor P1 and arrival of the processor P1's interest signal at the processor P2 (T1) is at least equal to the time gap between the processor P2's step (3) and the time the processor P2's interest signal reaches the processor P1; and (3) determines if an interest signal from other processors has arrived, and acquires the resource if no signal has arrived.

The invention covers within its scope, a method, an apparatus, hardware, software and/or firmware for implementing the invention.

The invention provides a method and apparatus for mutual exclusion of asynchronously interacting processors in self-directed distributed systems wherein the processors can operate with close to minimum delay, the system can be reliably utilized in time critical applications, investments in processor upgrades are not stifled by slow signal propagation speeds, and computing time is not wasted by idling processors.

DRAWINGS

These and other features, aspects and advantages of the present invention will become understood with reference to the following description, appended claims and accompanying drawings where:

FIG. 4 is pseudo code for one embodiment of the steps implemented in the mutual exclusion means of FIG. 3 for managing access to a resource by the processors;

FIG. 5 is an embodiment of computer steps implementing the pseudo code of FIG. 4;

FIG. 6 is a timing diagram for two processors in the system of FIG. 1 competing to acquire a resource;

FIG. 8a is pseudo code for one embodiment of the steps implemented in the mutual exclusion means of the primary processor of FIG. 7;

FIG. 8b is pseudo code for one embodiment of the steps implemented in the mutual exclusion means of a secondary processor of FIG. 7;

FIG. 9a is an embodiment of computer steps implementing the pseudo code of FIG. 8a;

FIG. 9b is an embodiment of computer steps implementing the pseudo code of FIG. 8b.

DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
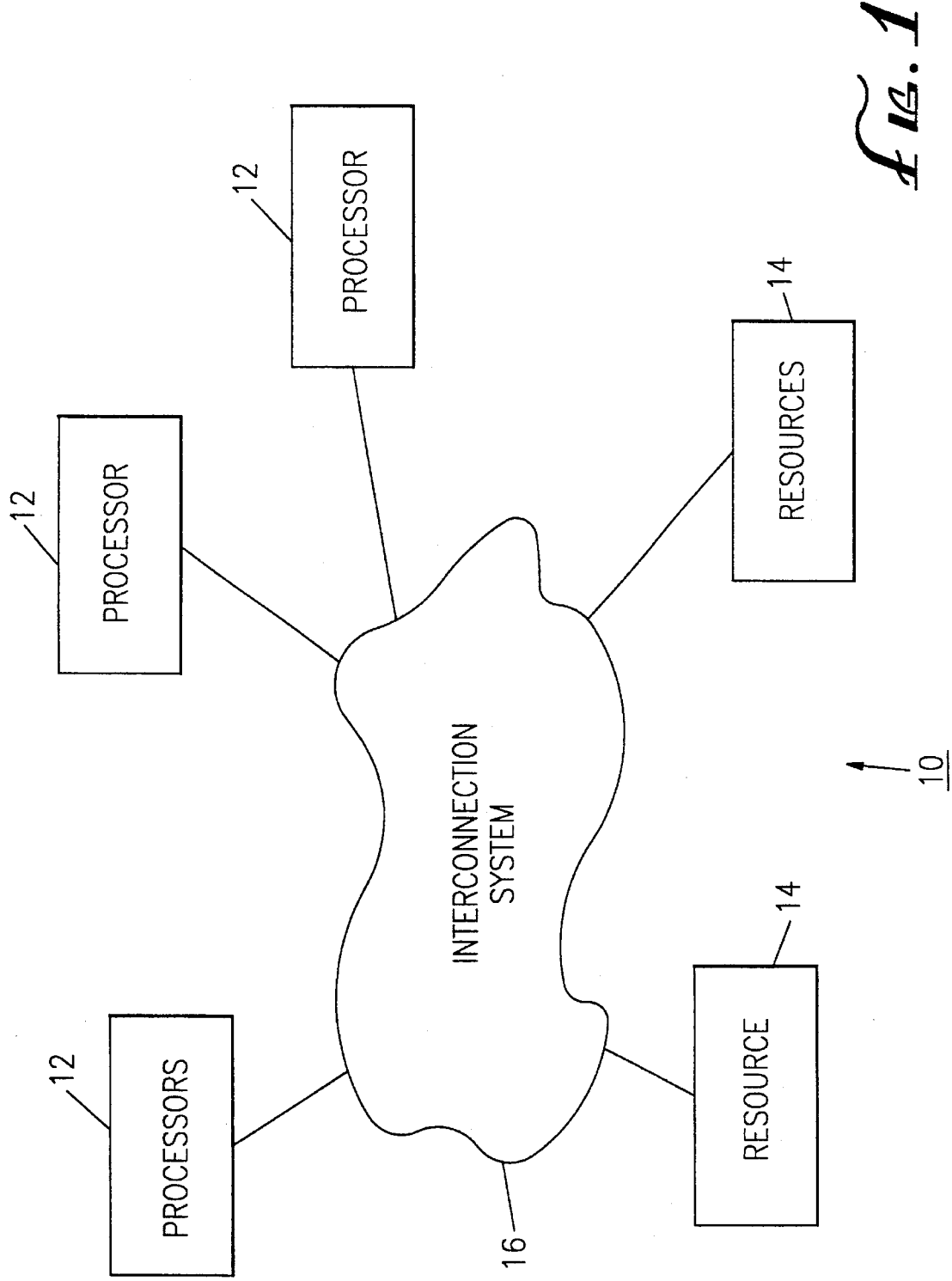
FIG. 1 is a block diagram of a distributed system embodying features of the invention.

FIG. 1 shows a multiprocessing computing environment 10 comprising a plurality of processors 12 and resources 14 in a distributed system interconnected via an interconnection system 16. The computing environment 10 can also be a real-time system, a wide area network, a local area network, or a network with a primary processor and a plurality of secondary processors, wherein the secondary processors run in a peer to peer network among themselves without being monitored by the primary processor.

As shown in FIG. 1, the processors 12 are interconnected such that each processor 12 can communicate with all other processors 12, and each processor 12 can access every resource 14. The processors 12 interact asynchronously and resource usage is not under centralized control of a single operating system. Rather, control is based on system status variables residing in each processor 12 (self-directed), as described below.

Figure 2:
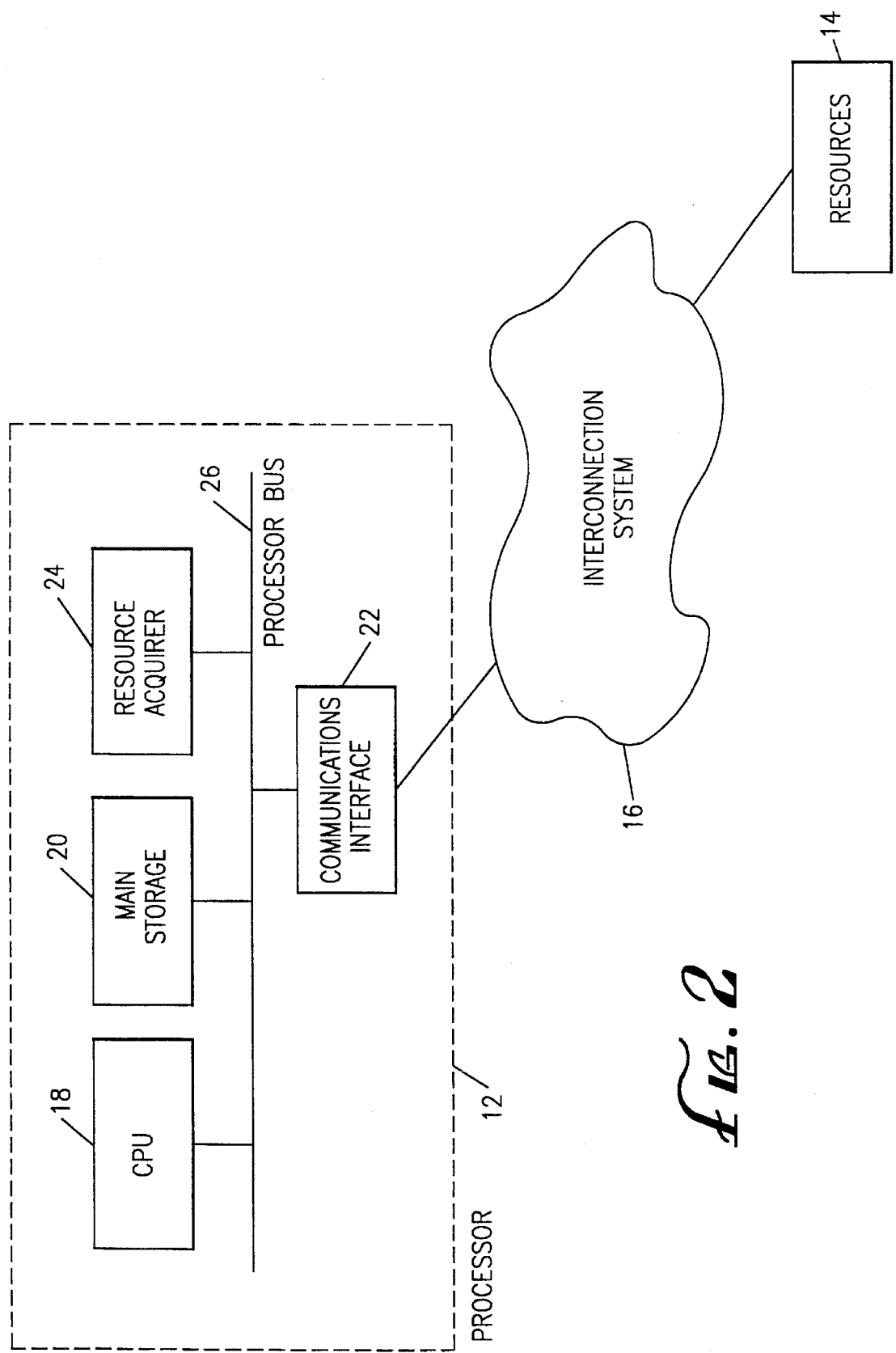
FIG. 2 is a schematic diagram of a processor of the system of FIG. 1.

FIG. 2 is a schematic diagram of a typical processor 12 of FIG. 1, the processor 12 comprising a Central Processing Unit 18 (CPU), a main storage 20, a communication interface 22, and a resource acquirer 24, all interconnected through a processor bus 26. The communication interface 22 is interconnected to the interconnection system 16. The CPU 18, the main storage 20, the resource acquirer 24, and the communication interface 22 can communicate with each other through the processor bus 26. The processor 12 can be a general purpose computer interconnected with other processors in a distributed system or network. The main 20 storage can be Random Access Memory (RAM), disk, or other storage devices currently existing or utilized in the future. Similarly, the CPU 18 can be any one of commercially available CPU's such as INTEL 80386. The communication interface 22 can be one of many commercially available systems including those used in personal computers, minicomputers, etc. Practitioners in the art can recognize numerous other possibilities for each of the components described above and later in this description.

Figure 3:
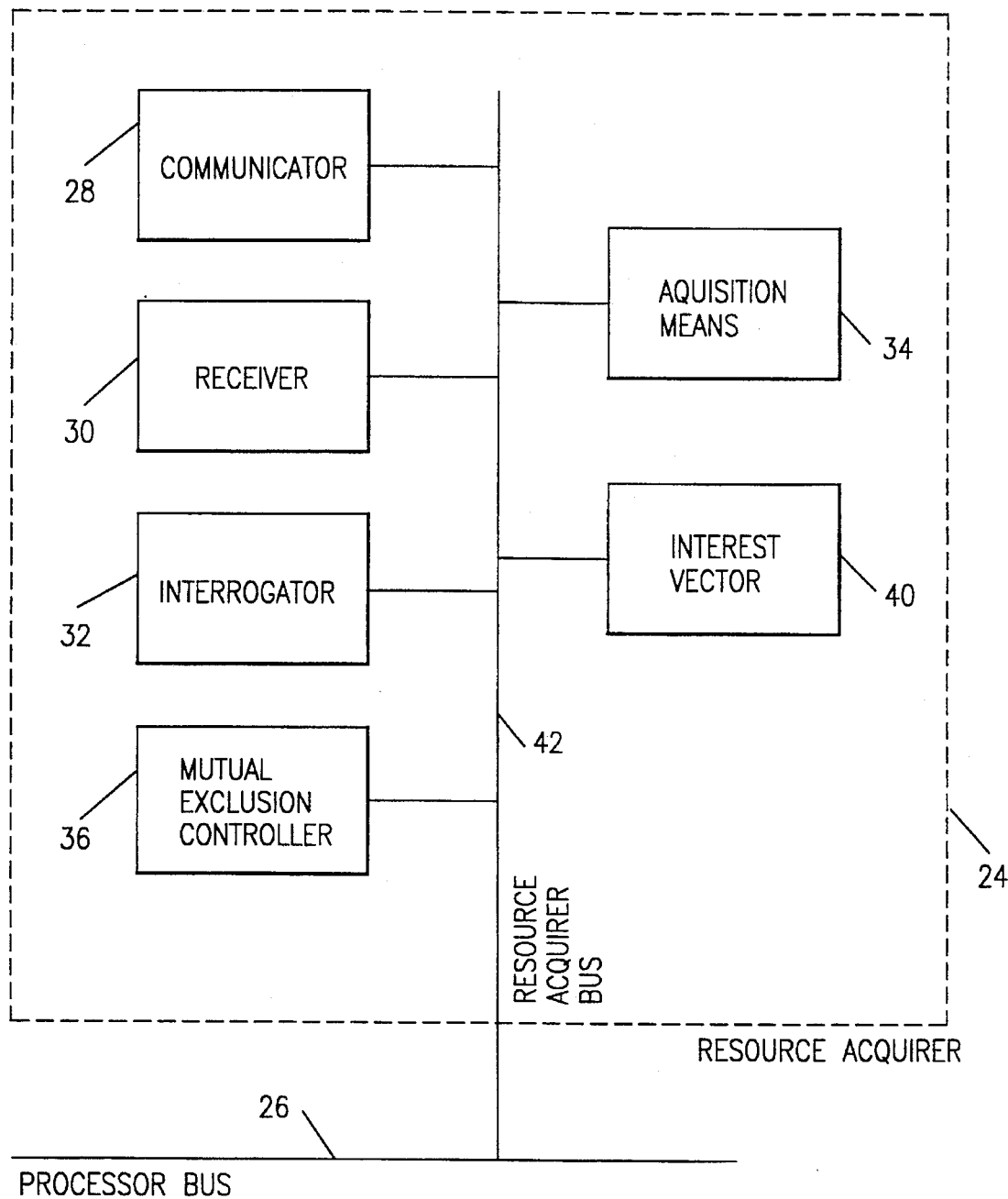
FIG. 3 is a schematic diagram of the resource acquisition means of the processor of FIG. 2.

As shown in FIG. 3, the resource acquirer 24 comprises a communicator 28, a receiver 30, an interrogator 32, an acquisition means 34, a mutual exclusion controller 36, and an interest vector 40, all interconnected via a resource acquisition bus 42. The resource acquisition bus 42 is interconnected to the processor bus 26 enabling the resource acquirer 24 to communicate with the other components of the processor 12.

The communicator 28 is used to send an interest signal to all other processors 12 for signaling the interest of the respective processor 12 in acquiring a resource 14. The receiver 30 and the interest vector 32 are used to receive and store the interest signal of every other processor 12 in acquiring a resource 14. The interrogator 32 is used to interrogate the interest vector 40 in the respective processor 12 to determine the availability of a resource 14. The mutual exclusion controller 36 is for mutually exclusive acquisition of a resource 14. The acquisition means 34 is responsive to the mutual exclusion controller 36 and is controlled by the mutual exclusion controller 36 to acquire a resource 14.

The mutual exclusion controller 36 further comprises a first controller (not shown) to allow the acquisition means 34 to acquire a resource 14 after the processor 12 sends out an interest signal, and only if the processor's interrogation of its interest vector 40 indicates no interest in acquiring the resource 14 by any other processor 12. The mutual exclusion controller 36 further comprises a second controller (not shown) to delay the interrogator 32 of each processor 12 such that for every pair of processors 12, P1 and P2, the processor P1's interrogation of its interest vector 40 is delayed a sufficient time after the processor P1's interest signal is sent, that the time gap between the processor P1's interrogation of its interest vector 40 and the arrival of the processor P1's interest signal at the processor P2 (T1) is at least equal to the time between the processor P2's interrogation of its interest vector 40 and the time the processor P2's interest signal arrives at the processor P1 (T2). Therefore, according to the invention, if the sum of the periods T1 and T2 for any two processors 12 is greater than or equal to zero, then the processors are assured mutual exclusion in their acquisition of the same resource 14 (i.e., T1+T2>=0).

In preferred embodiments of the invention the interrogation and acquisition events are parts of one indivisible operation in order to prevent "race" conditions where, for example, two processors 12 can start using the same desired resource 14 before either processor 12 has had sufficient opportunity to prevent the other from using the resource 14.

In the embodiments shown in the drawings, the interest vector 40 comprises storage means such as Random Access Memory (RAM) local to the resource acquirer 24. The interest vector 40 can also be a block of memory in the main storage 20 of the processor 12 where the block is accessible to the resource acquirer 24 through the processor bus 26 and the resource acquisition bus 42.

In another embodiment of the invention, the communicator 28 and the receiver 30 of the resource acquirer 24 can be sub-components of the communication interface 22 of the processor 12. In such embodiment, the communicator 28 and the receiver 30 are accessible to the resource acquirer 24 through the processor bus 26 and the resource acquisition bus 42.

In the embodiments shown in the drawings, the mutual exclusion controller 36 of the resource acquirer 24 can comprise a central processing unit (CPU) interconnected to a storage means such as Random Access Memory (RAM). The mutual exclusion controller 36 further comprises of a set of instructions to manage access to a resource 14 as described above.

In another embodiment of the invention, the mutual exclusion controller 36 comprises of the above set of instructions operable on the central processing unit 18 of the processor 12.

FIG. 4 shows pseudo code of one embodiment of the steps implemented in the mutual exclusion controller 36 of the resource acquirer 24 in managing access to a resource 14 by the processors 12.

FIG. 5 is one embodiment of computer steps implementing the pseudo code in FIG. 4 for a processor i (P$i$). The declaration on line 1 implements the interest vector 40 for the processor $P_i$ as shared boolean variables $a_i$. The assignment on line 3 ensures that initially the processor $P_i$ has no interest in acquiring a resource 14 registered in the interest vector 40 of the other processors 12. Line 4 represents processor activity without any need for accessing a shared resource 14. At line 5 the processor $P_i$ has decided to access a shared resource 14 and is about to begin the steps necessary to acquire such a resource 14. The assignment at line 5 is equivalent to Step 1 of FIG. 4, where the processor $P_i$ sends an interest signal to all other processors 12. At the end of the assignment on line 5, the signal from the processor $P_i$ has propagated to and received by all the other processors 12. Line 6 is equivalent to Step 2 of FIG. 4 where the processor $P_i$ enters a delay period the length of which is dictated by Step 2 of FIG. 4. Lines 7 and 8 of FIG. 5 are equivalent to Step 3 of FIG. 4 where the processor $P_i$ interrogates its interest vector 40 and acquires the resource 14 on Line 8 (i.e., enters the "critical section") if the interrogation indicates no interest in acquiring the resource 14 by any other processor 12.

The steps of FIG. 5 are indicative of the ordering of actions and not a literal sequence of machine instructions. Each action is completed before the ensuing action begins.

FIG. 6 is a timing diagram for two processors $P_i$ and $P_j$ competing to acquire the same resource 14. At time 1 processor $P_i$ sends an interest signal to acquire the resource 14 to all other processors 12. At time 2 processor $P_j$ sends a signal to acquire the resource 14 to all processors 12. At time 3 processor $P_i$'s signal arrives at processor $P_j$ and at time 4 processor $P_j$'s signal arrives at processor $P_i$. At time 5 processor $P_i$ begins interrogation of its interest vector 40 and acquires the resource 14 if no interest signal from other processors 12 has arrived. Processor $P_i$ delayed the interrogation of its interest vector 40 until time 5 as measured by $T_i$ from the time its interest signal arrived at processor $P_j$ at time 3. At time 6 processor $P_j$ begins interrogation of its interest vector 40 to acquire the resource 14 if no interest signal from other processors 12 has arrived. Processor $P_j$ delayed the interrogation of its interest vector 40 until time 6 as measured by $T_j$ from the time its interest signal arrived at processor $P_i$ at time 4. The period $T_i$ for a processor 12 is computed by subtracting the time when the processor's signal reaches another processor from the time the processor interrogates its interest vector 40.

The time periods $T_i$ and $T_j$ for the processors $P_i$ and $P_j$ are assigned such that processor $P_i$ does not begin interrogation of its interest vector 40 for a period $T_i$ after its interest signal arrives at processor $P_j$. Likewise processor $P_j$ does not begin interrogation of its interest vector 40 for a period $T_j$ after its interest signal arrives at processor $P_i$. According to the invention, if the sum of the time periods $T_i$ and $T_j$ for any two processors 12 is greater than or equal to zero, then the processors are assured mutual exclusion in their acquisition of the same resource 14.

The period $T_i$ is equivalent to the delay in Step 2 of the pseudo code in FIG. 4 and Line 6 of computer steps in FIG. 5. The period $T_i$ for a processor $P_i$ can be any value so long as the requirements of Step 2 of FIG. 4 are satisfied. In the preferred embodiments of the invention, the delay $T_i$ is selected to achieve a mutually exclusive system with close to minimum delay in managing mutually exclusive access to a shares resource 14. The delay $T_i$ for the processor $P_i$ can also be selected based on signal propagation delays between a given pair of processors 12 in the distributed system 10.

The delays $T_i$ can be easily changed by moving the processor 12 locations whereby signal propagation times are affected. Therefore, the delays $T_i$ are preferably assigned after the signal propagation times between the processors 12 in a distributed system 10 are determined. For example, setting delays $T_i$ for a system test before installing a multiprocessor system will not insure proper operation according to the invention in guaranteeing mutual exclusion. The propagation times in a factory floor test can be very different from those of a final installation due to different processor locations, and the chosen delays $T_i$ must reflect the signal propagation times in a final installation. Therefore, appropriate adjustments based on changed interprocessor signal propagation times are necessary.

Where the distance between processors 12 causes large propagation delays, broadcasting the signals is appropriate. The method of broadcast is immaterial so long as the propagation times are taken into account. The broadcasts can be via channels in a broadband LAN, via a communication net, using radio transmitters and receivers, etc. Should the transmission time of the medium be uncertain, as in a store-and-forward network, it will then be necessary to arrange that each signal broadcast await an echo to acknowledge receipt of the broadcast signal.

Figure 7:
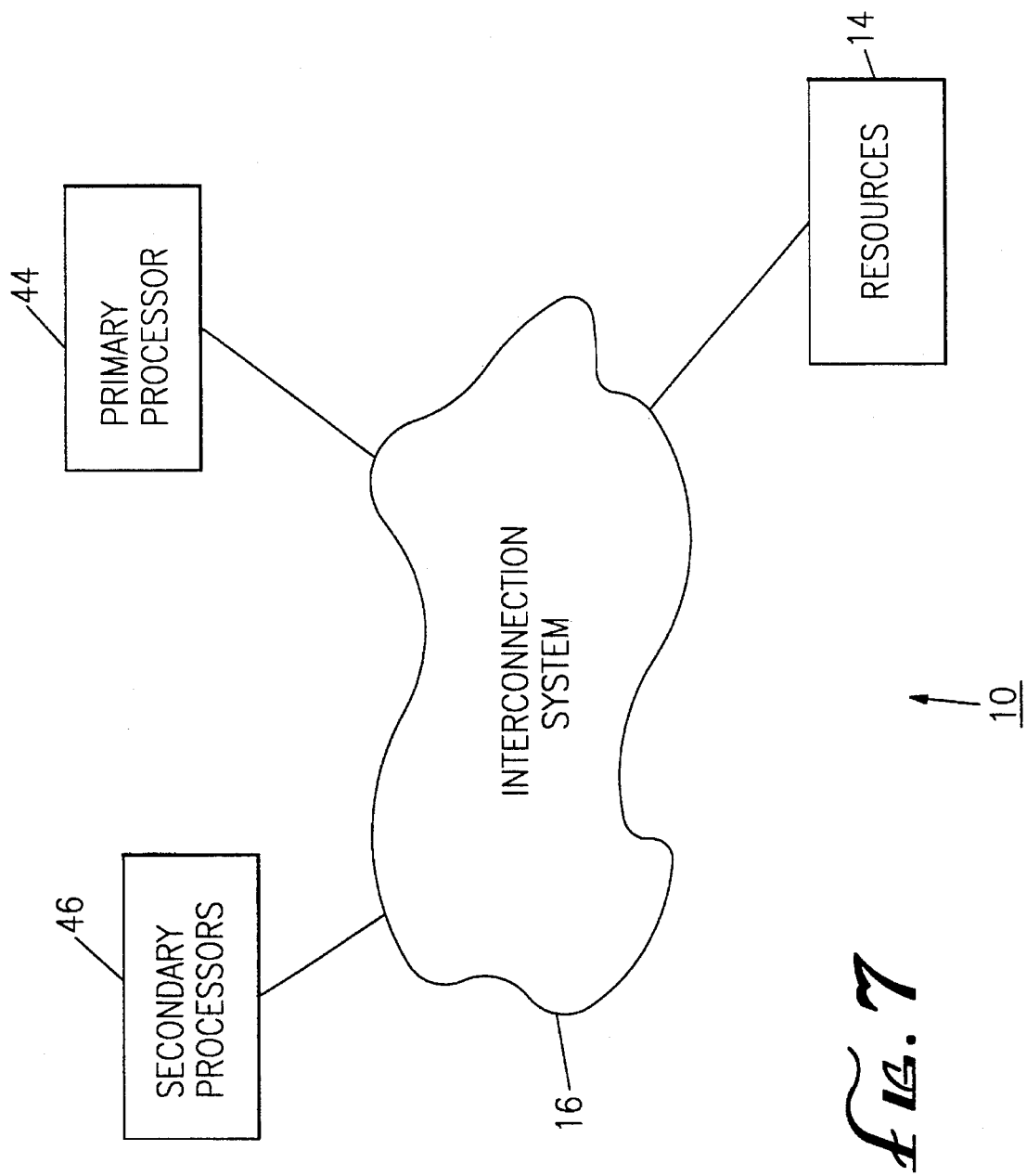
FIG. 7 is a block diagram of another distributed system embodying features of the invention.

In another embodiment of the invention, shown in FIG. 7, the computing environment 10 comprises of a primary processor 44, at least one secondary processor 46, resources 14 and an interconnection system 16. The primary and secondary processors, 44 and 46 respectively, comprise the same elements as described for processor 12 in FIG. 2 above. The resource 14 and the interconnection system 16 are as described for FIG. 1 above. The resource acquirer 24 for the primary and secondary processors, 44 and 46 respectively, is as described for FIG. 3 above.

The communicator 28 of the resource acquirer 24 of the primary processor 44 is for sending an acquisition signal to all secondary processors 46 for signalling the acquisition of a resource 14 by the primary processor to all secondary processors 46. The receiver 30 and the interest vector 40 of the primary processor 44 are for receiving and storing the interest signal of the secondary processors 46.

The communicator 28 of the resource acquirer 24 of each secondary processor 46 is for sending an interest signal to all other processors for signalling the interest of the respective secondary processor 46 in acquiring a resource 14. The receiver 30 and the interest vector 40 of each secondary processor 46 is for receiving and storing the interest signal of every other secondary processor 46 and for receiving and storing the acquisition signal of the primary processor 44.

For the primary processor 44 and each secondary processor 46, the interrogator 32 is for interrogating the interest vector 40 in the respective processor to determine the availability of a resource 14, and the mutual exclusion controller 36 is for mutually exclusive acquisition of a resource 14.

The mutual exclusion controller 36 of the primary processor 44 is the same as described for FIG. 3 except that: (1) the first controller (not shown) allows the acquisition means 34 to acquire a resource 14 only if the processor's interrogation of its interest vector 40 indicates no interest in acquiring the resource 14 by any other processor, wherein the primary processor 44 can acquire the resource 14 without first sending out an interest signal, and (2) the second controller (not shown) does not delay the interrogator 32 of the primary processor 44. Therefore, according to the invention, if the sum of the periods $T_1$ and $T_2$ for any two processors is greater than or equal to zero, then the processors are assured mutual exclusion in their acquisition of the same resource 14 (i.e., $T_1+T_2>=0$).

For the purposes of this paragraph only, $P_1$, $P_2$, $T_1$ and $T_2$ are the same as identified in the discussion of FIG. 3 above. The mutual exclusion controller 36 of a secondary processor 46 is the same as described for FIG. 3 except that the processor $P_2$ can be a secondary processor 46 or the primary processor 44 and $T_2$ is the time between the processor $P_2$'s interrogation of its interest vector 40 and the time the processor $P_2$'s interest signal, if a secondary processor 46, or acquisition signal, if the primary processor 44, arrives at the processor $P_1$. Therefore, according to the invention, if the sum of the periods $T_1$ and $T_2$ for any two processors is greater than or equal to zero, then the processors are assured mutual exclusion in their acquisition of the same resource 14 (i.e., $T_1+T_2>=0$).

FIG. 8a shows pseudo code of one embodiment of the steps taken by the mutual exclusion controller 36 of the primary processor 44 in managing access to a resource 14 by the primary processor 44. FIG. 8b is the pseudo code of the steps taken by the mutual exclusion controller 36 of the secondary processor 46 in managing access to a resource 14 by a secondary processor 46.

FIG. 9a is one embodiment of computer steps implementing the pseudo code in FIG. 8a for a primary processor $P_o$. FIG. 9b is one embodiment of computer steps implementing the pseudo code in FIG. 8b for a secondary processor $P_i$. Referring to FIG. 9a, the declaration on Line 1 implements the interest vector 40 for the primary processor $P_o$ as shared boolean variables $a_i$. The assignment on Line 3 insures that initially processor $P_o$ has no interest in acquiring a resource 14 registered in the interest vector 40 of the other processors. Line 4 represents processor activity without any need for accessing a shared resource 14. The statement at Line 5 is equivalent to Step 1 of FIG. 8a, where processor $P_o$ has decided to access a shared resource 14. Processor $P_o$ begins interrogation of its interest vector 40 and acquires the resource 14 if the interrogation indicates no interest in acquiring the resource 14 by any other processor. The assignment at Line 6 is equivalent to Step 2 of FIG. 8a, where processor $P_o$ sends an acquisition signal to all other processors informing them of the acquisition of the shared resource 14 by the processor $P_o$. At the end of the assignment on Line 6, the signal from processor $P_o$ has propagated to and received by all other processors. As such, processor $P_o$ sends an acquisition signal at Line 6 only after it has interrogated its interest vector 40 at Line 5 and acquired the resource 14 successfully. Line 7 shows processor $P_o$'s use of the acquired resource 14 (i.e., $P_o$ enters the "critical section").

FIG. 9b is one embodiment of computer steps implementing the pseudo code in FIG. 8b for a secondary processor $P_i$. The declaration on Line 1 implements the interest vector 40 for the secondary processor $P_i$ as shared boolean variables $a_i$. The assignment on Line 3 insures that initially the secondary processor $P_i$ has no interest in acquiring a resource 14 registered in the interest vector 40 of the other processors. Line 4 represents processor activity without any need for accessing a shares resource 14. At Line 5 processor $P_i$ has decided to access a shared resource 14 and is about to begin the steps necessary to acquire such a resource 14. The assignment on Line 5 is equivalent to Step 1 of FIG. 8b, where processor $P_i$ sends an interest signal to all other processors. At the end of the assignment on Line 5, the signal from processor $P_i$ has propagated to and received by all the other processors. Line 6 is equivalent to Step 2 of FIG. 8b where the processor $P_i$ enters a delay period the length of which is dictated by Step 2 of FIG. 8b. Lines 7 and 8 of FIG. 9b are equivalent to Step 3 of FIG. 8b where processor $P_i$ interrogates its interest vector 40 and acquires the resource 14 on Line 8 (i.e., enters the "critical section") if the interrogation indicates no interest in acquiring the resource by any other processor.

Figure 10:
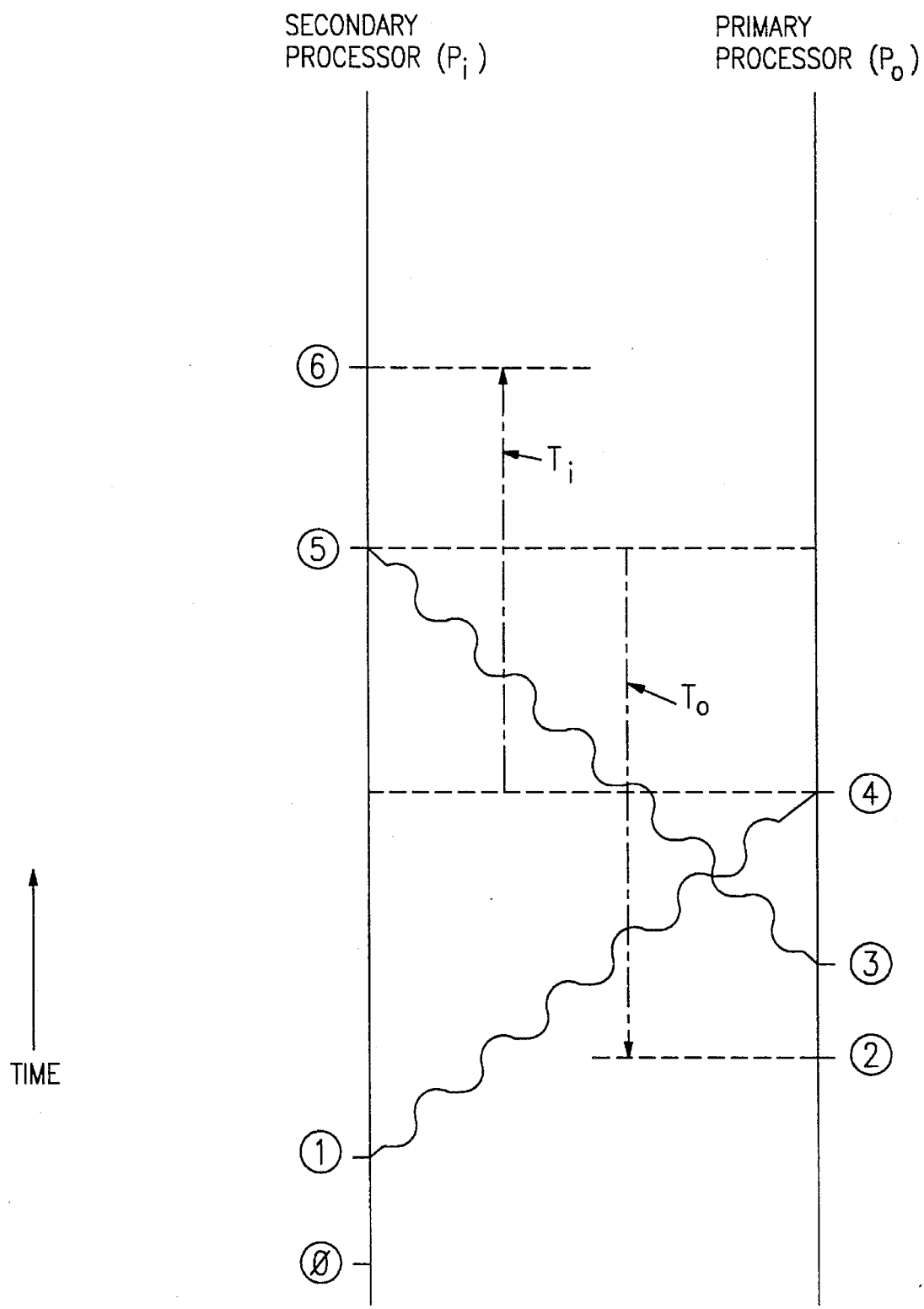
FIG. 10 is a timing diagram for the primary processor and a secondary processor in the system of FIG. 7 competing to acquire a resource.

FIG. 10 is a timing diagram for the primary processor $P_o$ and the secondary $P_i$ of FIGS. 9a and 9b competing to acquire the same resource 14. At time 1 the processor $P_i$ sends an interest signal to all processors to acquire the resource 14. At time 2 the processor $P_o$ begins interrogation of its interest vector 40 and acquires the resource 14 immediately if no interest signal from other processors has arrived. At time 3 the processor $P_o$ sends an acquisition signal to all processors. At time 4 the processor $P_i$'s signal arrives at the processor $P_o$ and at time 5 the processor $P_o$'s signal arrives at the processor $P_i$. At time 6 the processor $P_i$ begins interrogation of its interest vector 40 to acquire the resource 14 if no interest signal from other processors has arrived. The processor $P_i$ delayed the interrogation of its interest vector 40 until time 6 as measured by the time period $T_i$ from the time its interest signal arrived at the processor $P_o$ at time 4.

The time period $T_i$ for the processor $P_i$ is selected such that the processor $P_i$ does not begin interrogation of its interest vector 40 for a period $T_i$ after its interest signal arrives at the processor $P_o$. $T_i$ is computed by subtracting the time when the processor $P_i$'s signal reaches the processor $P_o$ at time 4 from the time the processor $P_i$ interrogates its interest vector 40 at time 6. Similarly, $T_o$ is computed by subtracting the time when the processor $P_o$'s signal reaches the processor $P_i$ at time 5 from the time the processor $P_o$ interrogates its interest vector 40 at time 2. Since time 5 is later than time 2 and is greater in magnitude than time 2, $T_o$ is a negative number. Thus, $T_i$ must be greater than or equal to the magnitude of $T_o$ for $T_o+T_i>=0$ according to the invention. Therefore, if the sum of the periods $T_o$ and $T_i$ is greater than or equal to zero, then the primary processor $P_o$ and a secondary processor $P_i$ are assured mutual exclusion in their acquisition of the same resource 14.

In one form the embodiment of FIG. 7 allows the primary processor $P_o$ to be a master processor, yet, simultaneously, while the master processor $P_o$ is not monitoring the system, the secondary processors $P_i$ can be running a peer-to-peer network amongst themselves. In this scheme the master processor $P_o$ can safely acquire a desired resource 14 if it is available and then send out an acquisition signal to the secondary processors $P_i$.

The time period $T_i$ is equivalent to the delay in Step 2 of the pseudo code in FIG. 8b and Line 6 of computer instructions in FIG. 9b. The delay $T_i$ for a processor $P_i$ can be any value so long as the requirements of Step 2 of FIG. 8b are satisfied. In the preferred embodiments of the invention, the delay $T_i$ is selected to achieve a mutually exclusive system with close to minimum delay in managing mutually exclusive access to a shares resource 14.

In another embodiment of the invention the system further comprises means for varying the periods $T_i$ and $T_j$ in FIG. 6, and for varying the periods $T_o$ and $T_i$ in FIG. 10. The system can further comprise means for varying these periods dynamically while the processors continue operating. Care must be taken to lock out all interest and acquisition signals during the interval of reassignment of the delays. Dynamic varying or reassignment of the aforementioned periods can reflect changing priorities, providing for a flexible system.

Therefore, in one embodiment of the system of FIG. 6, all the processors can cooperate in a peer-to-peer network for some period of time, and then by dynamic varying and reassignment of the aforementioned periods, one of the processors can be selected as the primary processor $P_o$ of the system of FIG. 10 whereby the primary processor $P_o$ can acquire a desired resource if it is available and then send out an acquisition signal to the other processors. In this embodiment, the primary processor can be a master processor and the other processors can be slave processors with the slave processors running a peer-to-peer network amongst themselves. Practitioners in the art can see that many other variations can be implemented.

In another embodiment of the invention dynamic checking of the signal propagation times or the aforementioned periods can be implemented to ensure that for all pairs of processors $P_i$ and $P_j$, $T_i+T_j>=0$ in order to provide mutually exclusive systems which can run with close to minimum delay.

In another embodiment of the invention the system 10 further comprises access means (not shown) for assuring that no circumstance totally denies access to a resource 14 by any processor, i.e., every processor desiring to acquire a resource is assured of ultimately acquiring the resource. (i.e., the system is "sure"). In this embodiment the access means comprises: (a) means within each processor for canceling the respective processor's interest signal and entering the processor into a dormant state only if the processor's interrogation of its interest vector means indicates interest in acquiring a resource by another processor, (b) means for activating only one dormant processor to retry acquiring the resource, and (c) means within each processor for activating all the dormant processors to retry acquiring the resource when any processor relinquishes the resource.

To implement the access means, the practitioner in the art need only add a "detour" for all processors finding an interest by another processor in acquiring the resource. The detour should first cancel the respective processor's own interest signal and then settle into a trap that holds all the processors but one of the competing processors. The untrapped processor is routed to try again. Furthermore, whenever a processor relinquishes the resource, the trap is opened for all competing processors to try again. This implementation can be in the form of computer instructions executable on the processor. Practitioners in the art recognize that other implementations are possible.

The above embodiments of the invention are only a few possible examples of the method and apparatus of the present invention. It is to be understood that the present invention is not limited to operation in accordance with the embodiments discussed in this description, and that one skilled in the art would readily understand how to modify the invention as disclosed to obtain equivalent results without departing from the spirit and scope of the present invention.

What is claimed is:

1. A multi-processor system comprising:
   (a) a primary processor;
   (b) at least one secondary processor;
   (c) an interconnection system interconnecting the processors, so that each processor can communicate with all other processors;

(d) a resource for shared access by all processors;

(e) communication means for each secondary processor for sending an interest signal to all other processors for signalling an interest of that secondary processor in acquiring the resource;

(f) communications means for the primary processor for sending an acquisition signal to all secondary processors for signalling the acquisition of the resource by the primary processor;

(g) receiving means and interest vector means for each secondary processor for receiving and storing the interest signal of all other secondary processors and for receiving and storing the acquisition signal of the primary processor;

(h) receiving means and interest vector means for the primary processor for receiving and storing the interest signal of the secondary processors;

(i) interrogation means for each processor for interrogating the interest vector means in that processor to determine the availability of the resource;

(j) acquiring means for the primary processor for acquiring the resource;

(k) first control means for allowing the primary processor's acquiring means to acquire the resource only if the primary processor's interrogation of its interest vector means indicates no interest in acquiring the resource by any secondary processor, wherein the primary processor can acquire the resource without first sending out an interest signal;

(l) second control means for delaying the interrogation means of each secondary processor a sufficient time from the time that secondary processor's interest signal is sent, that a time gap between that secondary processor's interrogation of its interest vector means and the arrival of that secondary processor's interest signal at the primary processor (T1) is at least equal to the time between the primary processor's interrogation of its interest vector means and the time the primary processor's acquisition signal arrives at that secondary processor (T2);

(m) acquiring means within each secondary processor for acquiring the resource after that secondary processor signals its interest in acquiring the resource; and (n) third control means allowing each secondary processor to acquire the resource only if that secondary processor's interrogation of its interest vector means indicates no interest in acquiring the resource by any other processor.

2. The system of claim 1 wherein the second control means for each secondary processor delays the interrogation means of that processor such that for every pair of secondary processors, P1 and P2, processor P1's interrogation of its interest vector means is delayed a sufficient time from the time the processor P1's interest signal is sent, that the time gap between the processor P1's interrogation of its interest vector means and the arrival of the processor P1's interest signal at the processor P2 (T1) is at least equal to the time between the processor P2's interrogation of its interest vector means and the time the processor P2's interest signal arrives at the processor P1 (T2).

3. The system of claim 2 further comprising means for varying the time gaps T1 and T2 for any given pair of processors.

4. The system of claim 3 further comprising means for varying the time gaps T1 and T2 dynamically while all the processors continue operating.

5. The system of claim 3 further comprising means for selecting the time gaps T1 and T2 based on duration of signal propagation between a given pair of processors.

6. The system of claim 3 further comprising monitoring means for monitoring the time gaps T1 and T2 to ensure that the time gap T1 is at least equal to the time gap T2 at all times.

7. The system of claim 1 further comprising access means for assuring that no circumstance totally denies access to the resource by any processor, whereby every processor desiring to acquire the resource can ultimately acquire the resource.

8. The system of claim 7 wherein the access means comprises:

(a) means for each processor for canceling that processor's interest signal and entering that processor into a dormant state if that processor's interrogation of its interest vector means indicates interest in acquiring the resource by another processor;

(b) means for activating only one dormant processor to retry acquiring the resource; and (c) means for activating all the dormant processors to retry acquiring the resource when any processor relinquishes the resource.

9. The system of claim 1 further comprising a plurality of resources for shared access by all processors, wherein the system controls shared access to the resources by the processors, and wherein each processor can acquire and retain at least one resource simultaneously.

10. The system of claim 9 wherein the system has at least one resource that is not shared by all the processors.

11. The system of claim 1 wherein the system has at least one processor that is not interconnected to all other processors.

12. The system of claim 1 wherein the multi-processor system is a network.

13. The system of claim 12 wherein the network is a local area network.

14. The system of claim 12 wherein the primary processor is a master processor and the secondary processors are slave processors, wherein the slave processors run a peer to peer network amongst themselves without being monitored by the master processor.

15. The system of claim 1 wherein the multi-processor system is a real-time system.

16. A system for control of access to a shared resource in a multi-processing computing environment, comprising:

(a) at least two processors;

(b) an interconnection system interconnecting the processors, whereby each processor can communicate with all other processors;

(c) a resource for shared access by the processors;

(d) communication means for each processor for sending an interest signal to all other processors for signalling an interest of that processor in acquiring the resource;

(e) receiving means and interest vector means for each processor for receiving and storing the interest signal of other processors;

(g) interrogation means for each processor for interrogating the interest vector means in that processor to determine the availability of the resource; and (h) acquiring means for each processor for acquiring the resource after that processor signals its interest in acquiring the resource;

(i) first control means for allowing the acquiring means for each processor to acquire the resource only if that processor's interrogation of its interest vector means indicates no interest in acquiring the resource by any other processor; and (j) second control means for delaying the interrogation means of each processor such that for every pair of processors, P1 and P2, processor P1's interrogation of its interest vector means is delayed a sufficient time from the time the processor P1's interest signal is sent, that a time gap between the processor P1's interrogation of its interest vector means and the arrival of the processor P1's interest signal at the processor P2 (T1) is at least equal to a time gap between the processor P2's interrogation of its interest vector means and the time the processor P2's interest signal arrives at the processor P1 (T2).

17. The system of claim 16 further comprising access means for assuring that no circumstance would totally deny access to the resource by any processor, whereby every processor desiring to acquire the resource can ultimately acquire the resource.

18. The system of claim 17 wherein the access means comprises:

(a) means for each processor for canceling that processor's interest signal and entering that processor into a dormant state if that processor's interrogation of its interest vector means indicates interest in acquiring the resource by another processor;

(b) means for activating only one dormant processor to retry acquiring the resource; and (c) means for activating all the dormant processors to retry acquiring the resource when any processor relinquishes the resource.

* * * * *